United States Patent [19]

Neff

[11] 4,106,793
[45] Aug. 15, 1978

[54] FLUID WEDGED DOUBLE LOCK FIFTH WHEEL

[75] Inventor: Charles G. Neff, Saratoga, Calif.

[73] Assignee: William F. Beebe, Holland, Mich. ; a part interest

[21] Appl. No.: 781,859

[22] Filed: Mar. 28, 1977

[51] Int. Cl.² ................. B62D 53/10; B62D 53/12
[52] U.S. Cl. .................................................. 280/435
[58] Field of Search ................ 280/435, 433, 434, 437

[56] References Cited

U.S. PATENT DOCUMENTS

| 1,660,946 | 2/1928 | Winn | 280/435 |
| 2,469,279 | 5/1949 | Seyferth | 280/435 |
| 2,553,959 | 5/1951 | Cook et al. | 280/435 X |
| 2,907,583 | 10/1959 | Dalton | 280/435 |

*Primary Examiner*—John A. Pekar
*Attorney, Agent, or Firm*—Price, Heneveld, Huizenga & Cooper

[57] ABSTRACT

A fifth wheel hitch having three kingpin engagement jaws, two being pivotally shiftable and the third being a plunger slidable in a track to engage the kingpin and simultaneously project between the two pivotal jaws to prevent opening thereof. A wedge is transversely shiftable by a two-way fluid cylinder between the plunger and stop surface on the track to lock the jaws closed.

8 Claims, 8 Drawing Figures

FLUID WEDGED DOUBLE LOCK FIFTH WHEEL

BACKGROUND OF THE INVENTION

This invention relates to a fifth wheel hitch.

Fifth wheel hitches have for decades consisted of a slide plate, usually bifurcated, with kingpin engagement mechanism. This mechanism has taken a variety of forms, typically being a pair of pivotal jaws, or a sliding lock element, or a single jaw, to name the most common forms.

In efforts to keep the mechanism in a closed, kingpin-retaining condition, various devices have been utilized. These include a wedge against the single jaw type, a plunger between the pair of pivotal jaws, and a yoke straddling the pivotal jaws as in U.S. Pat. No. 3,640,549.

Although such hitches have been and are being successfully used, it is important to constantly seek fifth wheel hitch constructions with even superior safety and operating characteristics.

SUMMARY OF THE INVENTION

The novel fifth wheel hitch of this invention has a special double lock kingpin-locking mechanism. A sliding plunger shifts into engagement with the kingpin between a pair of pivotal jaws. It also is engaged by a power activated wedge that locks the plunger in place, removing slack from the kingpin connection and rendering the connection secure.

The double lock of the unique hitch increases safety. There actually are three jaws, i.e. the two pivotal jaws and the plunger, all engaging the kingpin. The power operated locking wedge not only removes the slack, but can also be operable only from the tractor cab to prevent pranksters from releasing the connection.

DESCRIPTION OF THE PREFERRED EMBODIMENT

Figure 4:
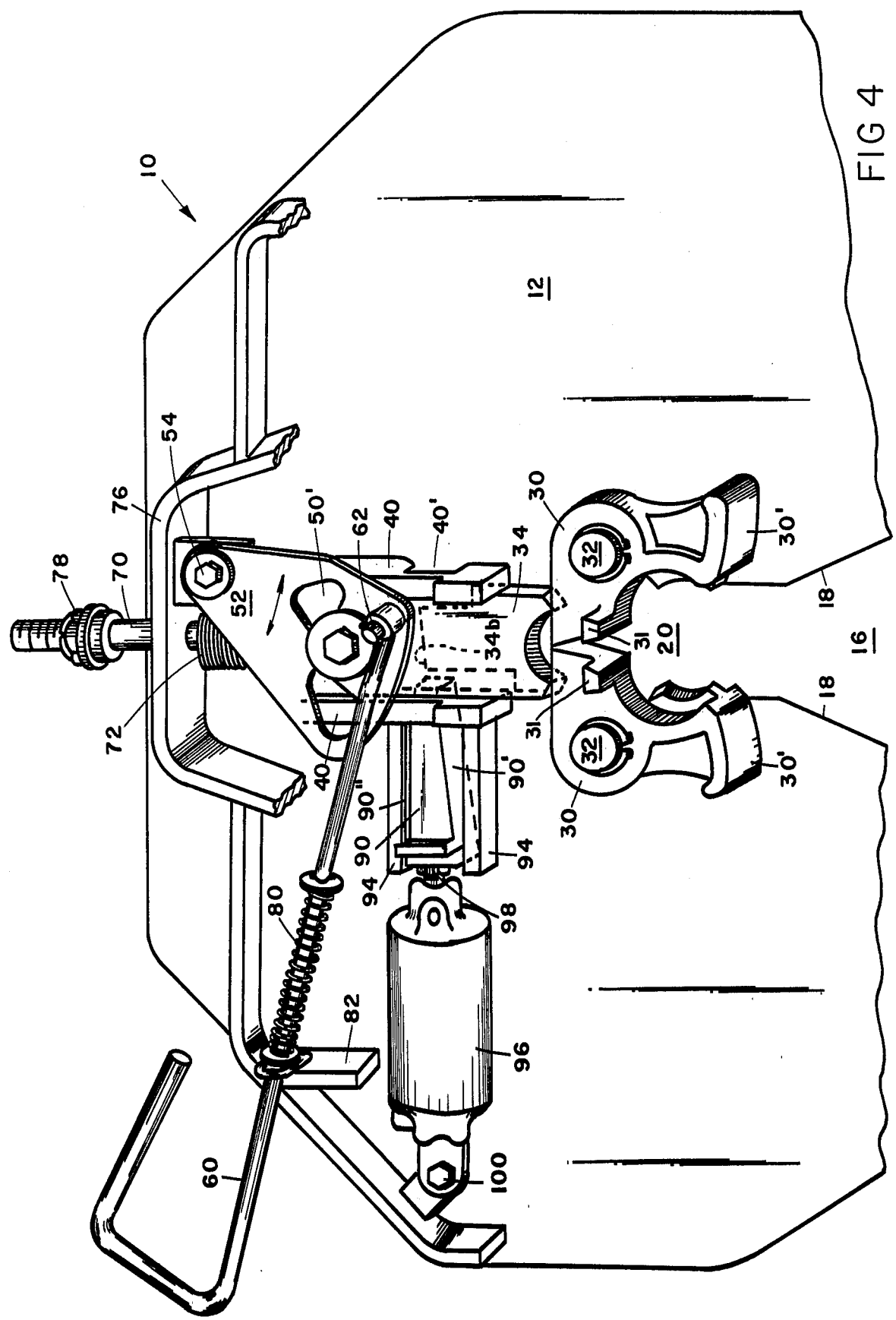
FIG. 4 is a bottom fragmentary, perspective view of the fifth wheel in the release condition.

Referring now specifically to the drawings, the fifth wheel assembly 10 includes a fifth wheel plate 12 of typical bifurcated construction, having rearward projections 14 which straddle a rearwardly oriented kingpin receiving mouth 16 therebetween. This mouth has engagement surfaces 18 on opposite sides thereof, which converge forwardly to a throat 20 (FIG. 4) centrally of the fifth wheel plate and hitch. The throat is blind, having a semi-cylindrical configuration on its blind forward end to receive a conventional kingpin with different diameter cylindrical portions.

The terms forward and rearward, when used herein, have reference to the forward and rearward portions of the hitch when mounted on a tractor.

The hitch has a pair of aligned trunnion cavities 24 on opposite lateral sides thereof to receive a pair of conventional trunnion pin assemblies to mount the fifth wheel on the vehicle. Adjacent throat 20 is secured a horizontal mounting plate 26 with portions actually astraddle of throat 20. This has a pair of vertical parallel cylindrical orifices 28 for pivotal attachment of a pair of mirror image jaws 30 with pivot pins 32. These jaws are simultaneously pivotable about these vertical pivot pins. The rearward portions 30' of the jaws can be shifted between a closed condition (FIG. 1) around a kingpin, and an expanded open condition for entry of or departure of a kingpin therebetween. Arcuate flanges 30a (FIG. 2) each engage approximately one-third of the kingpin by projecting into the conventional annular recess around the kingpin. The forward portions 30" of jaws 30 are shiftable from a spaced or spread condition relative to each other when portions 30' are in engagement with each other, to a condition approaching and abutting each other when portions 30' move apart. Forward portions 30" have abutment surfaces 30b (FIG. 2) facing each other, for abutting engagement with the opposite side walls 36 of a plunger 34. This plunger is rectilinearly shiftable between a retracted forward position (FIG. 2) where it is not between jaws 30, and an extended rearward position (FIG. 1) between forward portions 30" of jaws 30 and in engagement with jaw abutment surfaces 30' to retain them in tightly closed position around a kingpin. The rearward end of slide plunger 34 has a semi-circular concavity with an adjacent semi-circular flange 34a for engaging different diameter portions of somewhat more than one-third of the kingpin. Thus, the three jaw elements, i.e. the two pivotal jaws 30 and the slide plunger jaw 34 encircle the kingpin.

This kingpin-engaging portion of the slide plunger, in other words, moves between a rearward engagement position wherein the concave end of the slide is within the boundary of throat 20 and a retracted forward position wherein the end of the slide is out of the boundary of the throat. This fore to aft reciprocable rectilinear motion of the slide is guided by a slide track formed on the underside of the fifth wheel plate 12. This slide track basically includes a pair of spaced, parallel, vertical fore to aft side ribs 40 which straddle and guide the lateral edges of the plunger.

Mounted at the forward end of the plunger is a cam follower pin and roller 48 which projects vertically downwardly into the configurated cam track 50 of a cam plate 52. Plate 52 is pivotally mounted on pivot pin 54 laterally and forwardly offset from the cam follower such that arcuate movement of plate 52 in one direction or the other will cause the follower in the cam track to shift plunger 34 from its extended to its retracted position. This can be done by pulling on release handle 60 when the wedge is retracted as explained hereinafter.

Specifically, cam plate 52 is manually shiftable to the release condition by the pull handle 60 which extends laterally of the fifth wheel plate and has one end pivotally secured to pin 62 on cam plate 52. Plunger 34 is normally biased to the engaged position between the two pivotal jaws by a compression spring 70 which extends around a plunger rod 72 between the forward end of the plunger and a fixed cross plate 76 on the hitch. Rod 72 engages the forward end of plunger 34 on one end, and extends through fixed plate 76 such that retraction of plunger 34 causes visible protrusion of the end of rod 72 forwardly of the fifth wheel plate. Compression spring 72 therefore is imprisoned between flange 76 and plunger 34. Lock nuts 78 on the forward end of rod 72 enables adjustment of the locking position of the plunger. Pull handle 60 is also biased to the non-release condition by a compression spring 80 extending around rod 60 and entrapped between flange 82 of fifth wheel plate 12 and a lock collar 84 on rod 60, such that cam plate 52 is biased to the plunger lock position. It can be retained however, in the release position by pulling the cam plate to the end, causing the cam follower to be entrapped in the offset set end 50' of the cam track 50.

Figure 1:
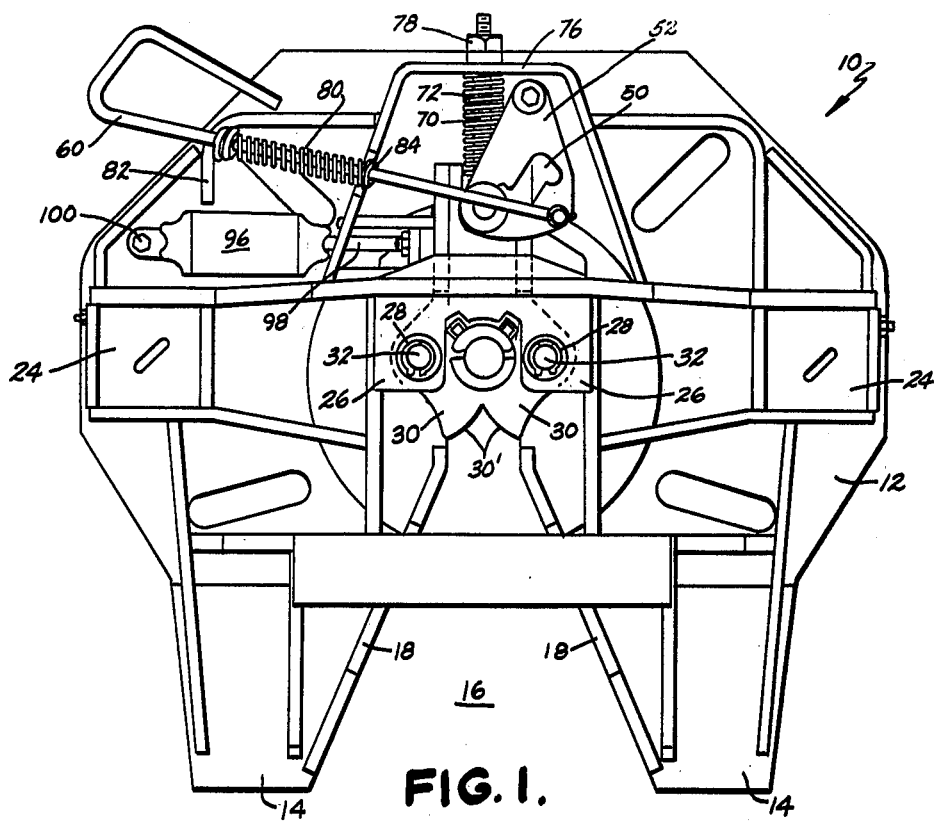
FIG. 1 is a bottom view of the fifth wheel employing this invention.
Figure 2:
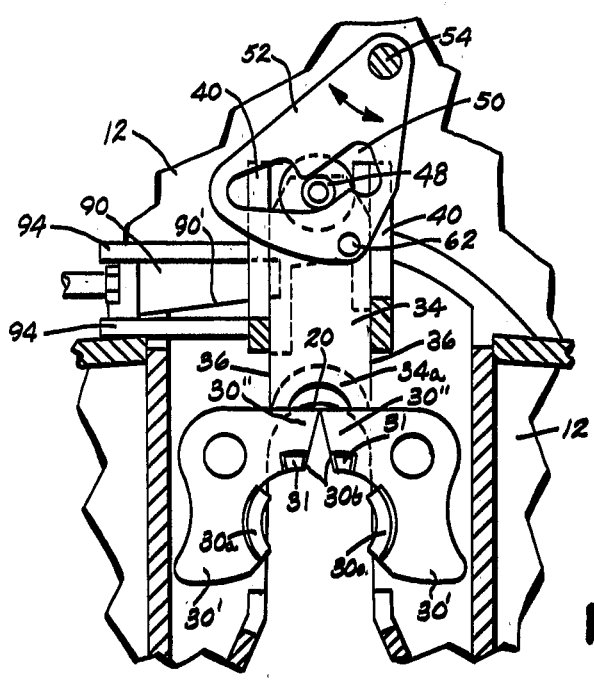
FIG. 2 is an enlarged fragmentary view of a portion of the apparatus in FIG. 1, in the release condition.
Figure 3:
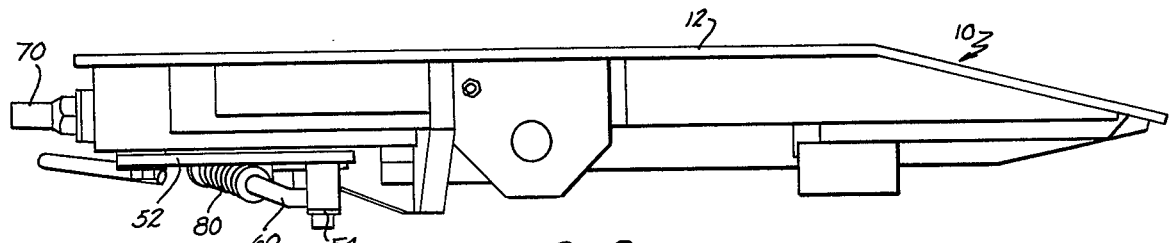
FIG. 3 is a side elevational view of the novel hitch apparatus.
Figure 6:
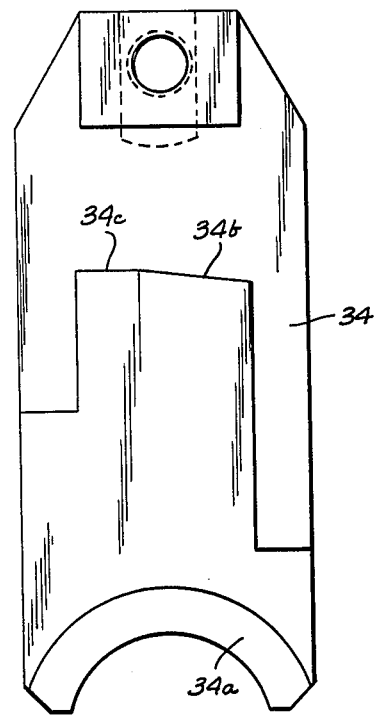
FIG. 6 is a top view of a special plunger forming a part of this invention.
Figure 7:
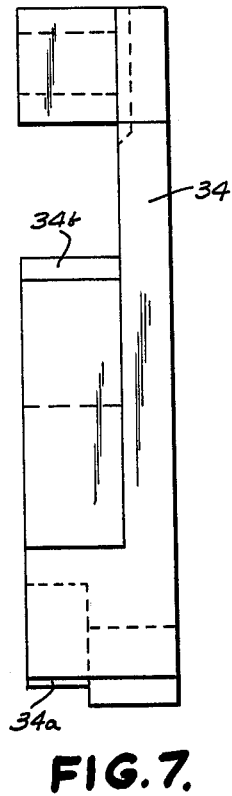
FIG. 7 is a side elevational view of the plunger in FIG. 6.
Figure 8:
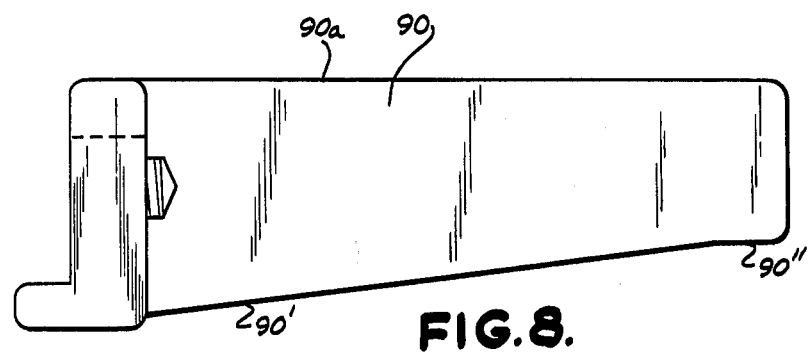
FIG. 8 is an enlarged bottom view of the locking wedge.

Plunger 34 is locked in its kingpin-engaging pivotal jaw locking condition by a special wedge 90. This tapered wedge is extendable through openings 40' (FIG. 4) in both elements 40 of the plunger slide track and through a special orifice in plunger 34 in the extended wedge position (FIG. 1). When the wedge is fully extended, its surface 90a opposite tapered surface 90' engages the forward walls of openings 40' so that the latter serves as a stop surface. The wedge, so extended, has its rearward tapered surface 90' engaging a correspondingly sloped abutment surface 34b at the rear edge of the plunger orifice. Wedge 90 is guided in its transverse reciprocal movement by a pair of vertical front and rear slide surfaces 94 (FIG. 2) projecting downwardly from fifth wheel plate 12. Wedge 90 is actuated by a two-way power actuator shown as a pneumatic fluid cylinder 96 having its piston rod 98 attached to the outer end of wedge 90 and the opposite end of the cylinder secured at connector 100 to the fifth wheel plate.

The inner end portion 90" of wedge surface 90' adjacent the nose of the wedge is flat (FIG. 10), i.e. normal to the front to rear direction of movement of plunger 34. Likewise, the furthermost portion 34c of abutment surface 34b of plunger 34 is correspondingly normal to the direction of plunger motion. Thus, any tendency of the wedge to retract by being wedged back from its locking condition by forwardly oriented pressure of the plunger due to pressure of the kingpin on the plunger, will be arrested after only slight movement of the wedge due to engagement of these flat surfaces 90" and 34c, at which time the force between these elements will be directly aligned with the direction of plunger movement and normal to the direction of wedge movement.

Figure 5:
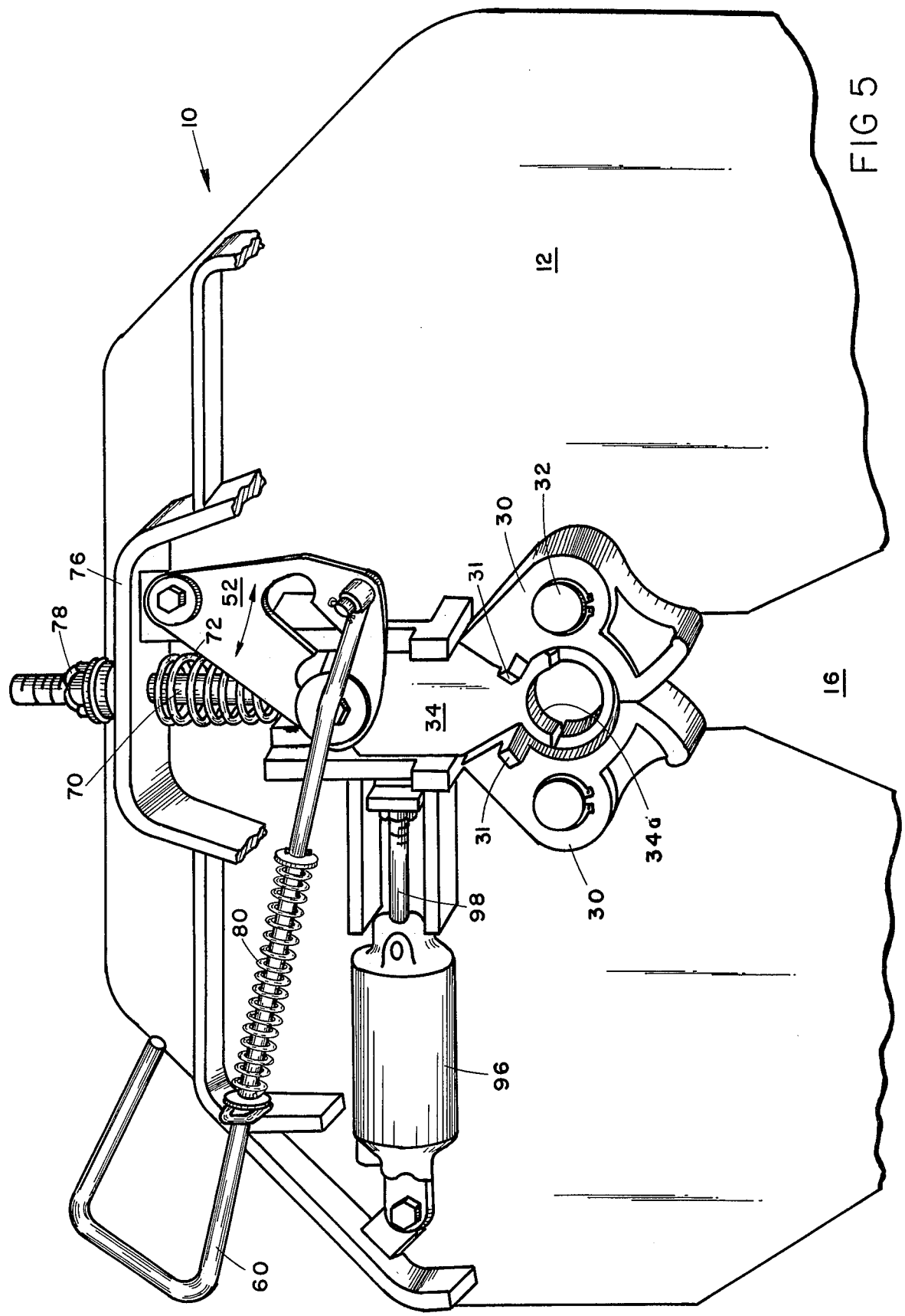
FIG. 5 is a bottom, fragmentary, perspective view of the fifth wheel in the locked condition.

Although operation of the apparatus will be apparent from the above description, a brief sequence of operation is set forth below to assure complete understanding. Assuming that the fifth wheel hitch disclosed is mounted on the rear of a truck tractor and is to be connected to a depending kingpin on the forward portion of a trailer, the operator actuates a pneumatic control in the tractor cab to retract fluid cylinder 96 and thereby wedge 90 from plunger 34. He then manually pulls handle 60 to retract the plunger by pivoting cam plate 52 such that cam follower 48 moves along cam track 50 from the position illustrated in FIGS. 1 and 5 to that illustrated in FIGS. 2 and 4. Then, as the kingpin enters mouth 16 and throat 20 of the fifth wheel hitch, the rearward portions 30' of pivotal jaws 30 will be forced apart by engagement of the kingpin with them, allowing the kingpin to move between the jaws. As it does so, the conventional annular protrusion on the kingpin engages the two knobs 31 protruding vertically down from forward portions 30" of jaws 30, to pivot the jaws to a closed position on the kingpin. Knobs 31 are a lock guard and insure a proper coupling. The kingpin must be in the proper attitude to contact these knobs or lock will not function. This thereby separates portions 30" as rearward portions 30' move together, to cause flanges 30a to engage in the annular groove of the kingpin. Typically, cam 52 will be in its intermediate position at this time, allowing compression spring 72 to bias plunger 34 toward the two jaws, such that the separated condition of jaw portions 30" allows the plunger 34 to shift between them. If, however, the cam plate 52 is in its fully retracted locked position, handle 60 is shifted part way to allow the plunger to snap into position between the jaws. In either event, the rearward end of the plunger engages the kingpin as a jaw, such that the plunger and the two pivotal jaws surround the kingpin. The operator then actuates the pneumatic control in the tractor cab to extend fluid cylinder 96, thereby slamming the wedge into retained locking engagement through the plunger. This forces the plunger tightly against the kingpin and, by the wedging action of the plunger between the two pivotal jaws, forces them tightly against the kingpin. This removes any "slop" around the kingpin connection and assures a constant snug engagement. Such is true even when there is wear of the jaws and/or kingpin. The constant fluid pressure on the cylinder maintains this tight safe connection. The retained wedge also prevents retraction until the operator again pneumatically releases the wedge using the two-way cylindrical actuator. Hence, pranksters or unfriendly personnel, e.g. feuding truckers, cannot release the hitch readily to create a safety problem on the highway. Additionally, if the equipment should lose fluid pressure while travelling on the highway, the jaw mechanism will stay in the closed locked position.

The kingpin is thus engaged by three jaws, two pivotal jaws and the plunger jaw. The plunger jaw moreover serves to lock the pivotal jaws against accidental opening. The wedge forces the plunger jaw and indirectly the other jaws tightly against the kingpin to eliminate sloppiness. Unauthorized release of the hitch cannot be achieved without access to the truck tractor cab to actuate the pneumatic control.

It is conceivable that certain minor details of this construction may be modified within the concept presented such that the preferred illustrative embodiment of the invention could assume a slightly different form without departing from the inventive concept set forth in the claims.

The embodiments of the invention in which an exclusive property or privilege is claimed are defined as follows:

1. A fifth wheel hitch having kingpin-locking mechanism comprising:

three kingpin engagement jaws; two of said jaws being pivotally mounted in opposing relation, each having a forward portion and being pivotally shiftable between a kingpin engagement position wherein said forward portions are spaced from each other and a kingpin-receiving or releasing position wherein said forward portions approach each other; the third jaw being a plunger shiftable between a retracted position spaced from between said pivotal jaw forward portions, and an extended kingpin engagement position between said pivotal jaw forward portions to thereby engage said kingpin while retaining said pivotal jaws from shifting out of kingpin engagement position; and powered fluid pressure locking means operable on said plunger for locking and maintaining said three jaws in snug engagement with the kingpin.

2. A fifth wheel hitch having a bifurcated slide plate with a convergent mouth terminating in a throat for receiving a kingpin, and kingpin locking mechanism at said throat having a pair of pivotally mounted jaws in opposing relation astraddle of said throat, each having a forward portion and a kingpin engagement portion, and each being pivotally shiftable between a kingpin engagement position wherein said forward portions are spaced from each other and a kingpin-receiving or releasing position wherein said forward portions approach each other; a plunger shiftable between a retracted position not between said pivotal jaw forward portions and an extended position between said pivotal jaw forward portions to retain said pivotal jaws from shifting out of kingpin engagement position; retractor means for retracting said plunger; transverse wedging means shiftable between a retracted condition and a plunger binding wedging condition; said plunger having a wedging surface aligned with said transverse wedging means when in said extended position between said pivotal jaw forward portions, for engaging said transverse wedging means; track means for guiding said plunger, and stop surface means transversely of said track means, said transverse wedging means being shiftable to a position between said stop means and said wedging surface to retain said pivotal jaws; and actuator means for shifting said transverse wedging means.

3. The fifth wheel hitch in claim 2 wherein said actuator means comprises a two-way fluid cylinder actuable in one direction to engage said wedging means between said stop means and said wedging surface for maintaining said jaws in snug engagement with the kingpin, and actuable in the opposite direction to retract said wedging means for release of said plunger and said pivotal jaws.

4. A fifth wheel hitch having a bifurcated slide plate with a convergent mouth terminating in a throat for receiving a kingpin, and kingpin locking mechanism at said throat comprising:

a pair of pivotal kingpin engagement jaws astraddle of said throat and movable between an open condition to receive or release a kingpin, and a closed condition to engage a kingpin, said jaws both having portions which move toward each other when said jaws are shifted to said open condition; a plunger shiftable rectilinearly from a retracted condition to an interference condition between said jaw portions to prevent said jaws from shifting to said open condition, said plunger having a kingpin engagement portion to serve as a third jaw as well as preventing said pair of jaws from opening; and locking wedging means shiftable into wedging engagement with said plunger when said plunger is in said interference condition, for locking said plunger and said pivotal jaws in said closed condition.

5. The fifth wheel hitch in claim 4 including track means for guiding said plunger, said locking wedging means being transversely shiftable, and two-way motor means connected to said locking wedging means for positioning and retaining said locking wedging means in either retracted or wedging conditions.

6. The fifth wheel hitch in claim 5 wherein said two-way motor means is a fluid cylinder for causing said locking wedging means to retain said three jaws snugly against a received kingpin.

7. The fifth wheel hitch in claim 5 wherein said track means includes a transverse stop surface area for engaging said locking wedging means in the plunger engagement condition of the wedging means.

8. A fifth wheel hitch having a bifurcated slide plate with a kingpin-receiving convergent mouth terminating in a throat for receiving a kingpin, and a pair of kingpin-receiving and engaging pivotal jaws astraddle said throat, said pivotal jaws each having forward portions, rearward portions and kingpin engaging portions; said pivotal jaws being pivotally movable between an open condition wherein said rearward portions of said jaws are spaced apart to receive or release a kingpin in said throat, and a closed condition wherein said rearward portions are together and said forward portions are spaced when said kingpin engaging portions are in kingpin engaging position; a third slidable jaw movable between a retracted condition and an extended jaw locking condition between said pivotal jaws when said pivotal jaws are in said closed condition, said third jaw having a kingpin engaging end which is in kingpin engaging position when said third jaw is in said extended condition; guide means for guiding said third jaw between its retracted and extended conditions; a locking wedge shiftable transversely of said third jaw, between a locking condition in binding engagement between said slidable jaw and said guide means, and an unlocking condition; and two-way power motor means operably connected to said locking wedge for shifting said locking wedge between said locking condition and said unlocking condition.

* * * * *